(12) United States Patent
Barthel et al.

(10) Patent No.: US 11,774,024 B2
(45) Date of Patent: Oct. 3, 2023

(54) CONNECTOR FOR CONNECTING TWO FLUID-CONDUCTING ELEMENTS

(71) Applicant: TI Automotive (Fuldabrück) GmbH, Fuldabrück (DE)

(72) Inventors: Iris Barthel, Schauenburg (DE); Kay Bube, Schenklengsfeld (DE); Reiner Rohde, Malsfeld (DE)

(73) Assignee: TI AUTOMOTIVE (FULDABRUECK) GMBH, Fuldabrueck (DE)

( * ) Notice: Subject to any disclaimer, the term of this patent is extended or adjusted under 35 U.S.C. 154(b) by 153 days.

(21) Appl. No.: 17/367,980

(22) Filed: Jul. 6, 2021

(65) Prior Publication Data

US 2022/0003347 A1  Jan. 6, 2022

(30) Foreign Application Priority Data

Jul. 6, 2020  (DE) .......................... 202020103903.2

(51) Int. Cl.
*F16L 37/12*  (2006.01)

(52) U.S. Cl.
CPC ....... *F16L 37/1225* (2013.01); *F16L 2201/10* (2013.01)

(58) Field of Classification Search
CPC ..... F16L 37/1225; F16L 37/144; F16L 37/12; F16L 37/142; F16L 37/148; F16L 2201/60
See application file for complete search history.

(56) References Cited

U.S. PATENT DOCUMENTS

| | | |
|---|---|---|
| 2016/0146386 A1 | 5/2016 | Blake et al. |
| 2016/0369922 A1 | 12/2016 | Blake et al. |
| 2018/0266602 A1 | 9/2018 | Fremont |
| 2019/0040982 A1 | 2/2019 | Cantrell et al. |
| 2019/0178429 A1 | 6/2019 | Rohde et al. |
| 2021/0396336 A1* | 12/2021 | Schröter ............. F16L 37/0841 |

FOREIGN PATENT DOCUMENTS

| | | | |
|---|---|---|---|
| CN | 1915794 | 2/2007 | |
| CN | 202715160 | 2/2013 | |
| CN | 105358201 A | 2/2016 | |
| CN | 106058526 A | 10/2016 | |
| CN | 206889970 | 1/2018 | |
| CN | 109282101 A | 1/2019 | |
| DE | 102018219440 A1 * | 5/2020 | .......... F16L 37/0841 |
| DE | 102018219440 A1 | 5/2020 | |
| JP | 2005069461 A | 3/2005 | |
| JP | 2017519170 A | 7/2017 | |

OTHER PUBLICATIONS

Translation DE-102018219440 (Year: 2018).*

* cited by examiner

*Primary Examiner* — Aaron M Dunwoody
(74) *Attorney, Agent, or Firm* — Dickinson Wright PLLC

(57) ABSTRACT

A connector for connecting two fluid-conducting elements, with a female plug-in part and a male plug-in part that can be inserted into the female plug-in part, wherein a retainer is hooked up to the female plug-in part, and can be used to fix the male plug-in part to the female plug-in part. The female plug-in part has at least one verification element, in particular in the form of a code, which in the unfixed state is unreadable or incomplete.

20 Claims, 9 Drawing Sheets

Fig. 1

CONNECTOR FOR CONNECTING TWO FLUID-CONDUCTING ELEMENTS

RELATED APPLICATIONS

The present disclosure claims priority to German Application 202020103903.2 filed on Jul. 6, 2020, the entire contents of each of which are incorporated herein by reference.

FIELD

The disclosure relates to a connector for connecting two fluid-conducting elements, in particular for connecting two motor vehicle pipes, with a female plug-in part and a male plug-in part that can be inserted into the female plug-in part, wherein a retainer is hooked up to the female plug-in part, and can be used to fix the male plug-in part to the female plug-in part. It lies within the framework of the disclosure that the connector according to the disclosure is a rapid connector or quick connector. The connector according to the disclosure expediently involves a VDA connector according to the VDA standard or an SAE connector according to the SAE standard. A preferred embodiment of the disclosure is characterized in that the connector is used to connect two pipes or tubes, in particular two motor vehicle tubes.

BACKGROUND

Connectors of the aforementioned kind are basically known from practice in various embodiments. However, it has been demonstrated that connecting two fluid-conducting elements, for example two motor vehicle pipes or tubes, with the known connectors is prone in part to error, so that undesired leaks arise. This can be attributed in particular to the fact that the connector parts are assembled in a tight space or installation space. As a consequence, connection errors have been observed in practice, which arise in particular when the male plug-in part is not properly and correctly fixed to the female plug-in part due to incomplete assembly. The resulting connection is then not functionally reliable, and in particular not tight, so that fluids such as fuel, coolant and the like can exit, and the connection is even released in an extreme case. The problems observed while assembling the known connectors arise in particular because it cannot be clearly and reliably determined whether the connection was correctly manufactured. Basically known from practice to counteract the occurrence of connection errors are connectors with devices for indicating the correct connection between a male and female plug-in part. However, the display of a proper connection for these connections is as a rule associated with a very complex structure and a high production outlay or high production costs. In addition, connection errors continue to arise in at least several of the connectors known from practice that have devices to indicate the correct connection, because the correct assembly or connection between the male and female plug-in part is not indicated with sufficient reliability and is in particular not clearly indicated. There is a need for improvement in this regard.

BRIEF SUMMARY

By contrast, the technical problem underlying the disclosure is to indicate a connector of the kind mentioned at the outset, in which the proper connection between the male and female plug-in part is indicated in a functionally reliable and clear manner, and which is nonetheless characterized by a simple and less complex structure, so that connection errors can be avoided.

In order to resolve this technical problem, the disclosure teaches a connector for connecting two fluid-conducting elements, in particular for connecting two motor vehicle tubes or pipes, with a female plug-in part and a male plug-in part that can be inserted into the female plug-in part, wherein a retainer is hooked up to the female plug-in part, and can be used to fix the male plug-in part to the female plug-in part. The connector according to the disclosure is characterized in that the female plug-in part has at least one verification element, in particular in the form of a code, which in the unfixed state of the male plug-in part is covered at least in areas by at least one aperture arranged on the female plug-in part, and is unreadable and/or that the female plug-in part has at least one part of a verification element, in particular in the form of a part of a code, wherein the verification element or the code is incomplete and unreadable in the unfixed state of the male plug-in part, and wherein at least one additional or the missing part of the verification element or code is arranged on at least one aperture arranged on the female plug-in part, wherein the at least one aperture is shifted in such a way during insertion of the male plug-in part into the female plug-in part that the verification element or the code is complete and/or readable in the fixed or completely inserted state of the male plug-in part.

According to the disclosure, the female plug-in part has at least one verification element and/or at least one part of a verification element. Within the framework of the disclosure, verification element in particular means an element which can be used to clearly indicate or verify the proper connection, meaning the state in which the male plug-in part is inserted completely into the female plug-in part and fixed by the retainer to the female plug-in part. In particular, the verification element can be a code. In the unfixed state of the male plug-in part, the code is unreadable according to the disclosure, because it is covered and/or incomplete. Within the framework of the disclosure, readable means in particular that the verification element or the code can be completely and correctly read. In particular, readability can relate to a complete and correct visual readability and/or to a complete and correct readability by a computer. It is basically also possible that the uncovered part of the code and/or the incomplete code can in principle be read. According to the disclosure, however, the complete code that verifies the proper connection can only be correctly read when the male plug-in part is properly fixed to the female plug-in part.

Within the framework of the disclosure, the term aperture refers in particular to an element that covers at least areas of the verification element or the code and/or has or carries a part or the missing part of a verification element. Therefore, the aperture according to the disclosure need not necessarily cover a part of the verification element; rather, shifting the aperture according to the disclosure while inserting the male plug-in part according to the disclosure results in the at least one verification element or the at least one code being complete and/or readable in the fixed or completely inserted state of the male plug-in part. Within the framework of the disclosure, the fixed state of the male plug-in part refers to the state in which the male plug-in part is completely inserted into the female plug-in part and fixed to the female plug-in part by the retainer. By contrast, the term unfixed state within the framework of the disclosure refers in particular to the state in which the male plug-in part has not yet been inserted into the female plug-in part or has not yet been completely inserted into the female plug-in part.

According to the disclosure, the aperture covers at least areas of the verification element or the code and/or the aperture has a part or the missing part of the verification element or the code. As a result of shifting the aperture, the previously covered part of the verification element or the code is released or no longer covered, so that it is readable, or the various parts of the verification element or the code are combined, so that the code is completed and readable. The disclosure is based on the knowledge that the properly fixed state of the male plug-in part to the female plug-in part is indicated in a functionally reliable and proper manner by virtue of the fact that the verification element or the code is complete and correctly readable. In this way, it can be clearly determined whether the connection was correctly established, since the code is only readable or correctly readable in the properly fixed state of the male plug-in part to the female plug-in part.

If a part or the missing part of the verification element or the code is arranged according to the disclosure on an aperture arranged on the female plug-in part, it lies within the framework of the disclosure that the additional or missing code part is provided on at least one transparent film, which is arranged on the aperture. When inserting the male plug-in part into the female plug-in part, the aperture is then expediently shifted together with the transparent film, so that, in the fixed or completely inserted state of the male plug-in part, the code part on the transparent film together with the code part of the female plug-in part yields a complete and readable code. It is basically also possible that part of a code or the missing part of the code is arranged directly on the aperture, and then yield the complete and readable code together with the part of the code of the female plug-in part, expediently after shifting the aperture while inserting the male plug-in part.

If according to the disclosure the at least one verification element or the at least one code is covered at least in areas by an aperture arranged on the female plug-in part and unreadable in the unfixed state of the male plug-in part, it lies within the framework of the disclosure that the verification element or the code is completely or essentially completely covered by the aperture. It is also possible that only areas or sections of the verification element or the code are covered by the aperture, wherein the code is then still not readable or not completely and correctly readable in the unfixed state of the male plug-in part.

According to a very preferred embodiment of the disclosure, the verification element is designed like a code. The code especially preferably involves a readable code, and very especially preferably a machine readable code. This embodiment is based upon the knowledge that the readable, in particular machine readable, code can only be correctly readable if a proper connection was established between the male plug-in part and the female plug-in part. The readable code or machine readable code can then be read in particular by a readout device, so that the proper connection is verified. According to a very preferred embodiment variant of the disclosure, the verification element or the code is a QR code and/or a barcode and/or a DataMatrix code. It is also possible for the code to be a unicolor or multicolor color code. It is further possible for the verification element or the code to be part of an RFID circuit or RFID system.

It is recommended that the verification element or the code is arranged on or against the outer surface of the female plug-in part. In the fixed state of the male plug-in part, it is in this way possible for the code to be accessible from the outside of the connector and read out, for example by a readout device. The readout device for reading the verification element or the code can expediently involve a scanner, a mobile phone, an RFID reader or the like. If the female reader only has one part of a verification element or one part of a code according to the disclosure, it is recommended that this part of the code is arranged on the outer surface of the female plug-in part.

According to a very preferred embodiment of the disclosure, the verification element or the code is immovably or essentially immovably arranged on the female plug-in part, for example on or against the outer surface of the female plug-in part. Within the framework of this embodiment, the verification element or the code that is arranged on the female plug-in part, in particular on or against its outer surface, is not movable relative to the female plug-in part.

If according to the disclosure only one part of a verification element or one part of a code is arranged on the female plug-in part, in particular on or against the outer surface of the female plug-in part, this part of the verification element or this part of the code is preferably immovably or essentially immovably arranged on the female plug-in part, and the other part or missing part of the verification element or the code arranged on the aperture is movable relative to the female plug-in part, so that the code is completed when inserting the male plug-in part into the female plug-in part, and is then readable or correctly readable.

According to one embodiment of the disclosure, the aperture is axially shifted in the insertion direction while inserting the male plug-in part into the female plug-in part. While inserting the male plug-in part into the female plug-in part, the aperture is preferably guided axially in the insertion direction along the outer surface of the female plug-in part. It is recommended that the code or the part of a code is arranged on or against the outer surface of the female plug-in part, and that the aperture also is arranged on the outer surface of the female plug-in part, and, while inserting the male plug-in part into the female plug-in part, expediently is shifted or guided axially in the insertion direction, in particular along the outer surface of the female plug-in part, axially in the insertion direction.

It lies within the framework of the disclosure for the aperture to be designed as a pinhole. In the fixed or completely inserted state of the male plug-in part, the verification element or the code is preferably readable by at least one recess of the pinhole. It is preferred that the aperture is designed as a plate-like element. If the aperture according to the preferred embodiment is designed as a pinhole, it lies within the framework of the disclosure for the aperture to be a plate-like element with at least one recess or at least one hole, which can be used to read the verification element or the code in the fixed state of the male plug-in part. In the unfixed state of the male plug-in part, the verification element or the code is expediently covered at least in areas by an edge area surrounding the at least one recess of the pinhole, in particular at least in areas by an edge area of the pinhole arranged behind the recess in the insertion direction of the male plug-in part.

In a recommended embodiment of the connection according to the disclosure, the male plug-in part and/or the female plug-in part is designed based upon at least one plastic. The male plug-in part and/or the female plug-in part preferably consists of at least one plastic or essentially of at least one plastic. The male plug-in part and/or the female plug-in part especially preferably consists of at least one plastic or essentially of at least one plastic selected from the group "aliphatic polyamide, aromatic polyamide, polyphenylene sulfide (PPS)". Other plastics basically also lie within the framework of the disclosure as the material for the male plug-in part and/or the female plug-in part, for example such as polyurethanes and/or polyolefins, in particular polypropylene. According to one embodiment, the male plug-in part and the female plug-in part are manufactured out of different plastics. It is possible for the male plug-in part and the female plug-in part to be designed based on the same plastic, and in particular to consist or essentially consist of the same plastic. It is further possible for the male plug-in part to be designed based on at least one metal, and in particular to consist or essentially consist of metal.

In a preferred embodiment of the disclosure, the retainer according to the disclosure consists of at least one metal or essentially of at least one metal. The retainer expediently consists of steel or essentially of steel. Within the framework of an alternative embodiment of the disclosure, it is possible for the retainer to consist of at least one plastic or essentially consist of at least one plastic, for example consist or essentially consist of a polyamide and/or polyphenylene sulfide.

It is preferred that the aperture consists of at least one metal or essentially consists of at least one metal. The aperture is especially preferably designed as a plate-like element, which consists or essentially consists of at least one metal. It is very especially preferred that the aperture is a metal sheet, for example a metal pinhole. According to an alternative embodiment, the aperture is designed based on at least one plastic, and expediently consists of at least one plastic.

It lies within the framework of the disclosure that the female plug-in part has at least one retainer recess, wherein the retainer engages through or completely engages the at least one retainer recess in the fixed state of the male plug-in part. The female plug-in part expediently has two opposing retainer recesses, which are preferably designed as retainer slits. It is recommended that the retainer engages behind a stop flange of the male plug-in part in the completely inserted or fixed state of the male plug-in part. In the completely inserted or fixed state of the male plug-in part, the retainer especially preferably engages into a fixing groove of the male plug-in part. The fixing groove preferably goes around the circumference of the male plug-in part by at least 90%, preferably by at least 95%. According to an especially preferred embodiment, the fixing groove completely or essentially completely goes around the circumference of the male plug-in part.

The retainer is expediently U-shaped in design, with a U-bracket and two U-legs hooked up to the U-bracket. In the completely inserted or fixed state of the male plug-in part, the U-legs each preferably engage through a retainer recess of the female plug-in part or engage through the latter completely. The U-legs here very preferably engage behind the stop flange of the male plug-in part, and the U-legs very especially preferably engage into the fixing groove of the male plug-in part. It is recommended that the two U-legs are hooked up to the U-bracket in a springy elastic manner.

One preferred embodiment variant of the disclosure is characterized in that the aperture can be shifted via direct and/or indirect interaction with the male plug-in part. In this conjunction, direct interaction means in particular that the male plug-in part interacts directly with the aperture or engages against this aperture during insertion into the female plug-in part. In this conjunction, indirect interaction means in particular that the male plug-in part does not directly interact with the aperture or engage against the latter during insertion into the female plug-in part, but rather interacts by means of another element of the connector with the aperture, so that the latter is shifted.

According to an especially preferred embodiment of the disclosure, the aperture has at least one contact extension for interacting with the male plug-in part. The contact extension preferably engages through a contact recess of the female plug-in part, and preferably projects into the interior space of the female plug-in part. The female plug-in part expediently has a plug-in recess, into which the male plug-in part can be inserted during the insertion process. The contact extension of the aperture expediently engages through a contact recess of the female plug-in part, and preferably projects into the plug-in recess in the interior space of the female plug-in part. In this way, the male plug-in part can directly and/or indirectly interact with the contact extension during the insertion process, so that the aperture is shifted. In this conjunction, contact recess means in particular a recess that the contact extension of the aperture can expediently engage through from the outer surface of the female plug-in part, in order to in this way project into the interior space or the plug-in recess of the female plug-in part.

It lies within the framework of the disclosure that the male plug-in part has at least one centering element, which in the fixed or completely inserted state of the male plug-in part engages into a form-fit recess of the female plug-in part, which is preferably arranged on the inner surface of the female plug-in part. The at least one centering element expediently protrudes out of the outer surface of the male plug-in part, and engages into a form-fit recess on the inner surface of the plug-in recess of the female plug-in part. According to a preferred embodiment of the disclosure, the outer surface of the male plug-in part has two centering elements, which preferably are arranged opposite each other on the outer surface of the male plug-in part, and preferably engage into two complementary form-fit recesses on the inner surface of the plug-in recess of the female plug-in part.

According to a preferred embodiment of the disclosure, the aperture can be shifted through direct and/or indirect interaction with the at least cone centering element of the male plug-in part. The contact extension of the aperture especially preferably protrudes into a form-fit recess of the female plug-in part, and the centering element of the male plug-in part especially preferably interacts with the contact extension of the aperture during insertion of the male plug-in part into the female plug-in part, and in particular interacts directly with the contact extension of the aperture, so that the aperture is shifted. It is recommended that a centering element of the male plug-in part directly contacts the contact extension of the aperture during the process of inserting the male plug-in part into the form-fit recess, and in this way shifts the aperture.

BRIEF DESCRIPTION OF THE DRAWINGS

The disclosure will be described in greater detail below with reference to drawings, which only represent embodiments teaching examples of the disclosure. Schematically shown on.

DETAILED DESCRIPTION

The figures show a connector 1 for connecting two fluid-conducting elements, in particular for connecting two motor vehicle pipes or tubes 2, 3. The connector 1 has a female plug-in part 4 and a male plug-in part 5 that can be inserted into the female plug-in part 4. A retainer 6 is hooked up to the connector 1 according to the disclosure, and can be used to fix the male plug-in part 5 to the female plug-in part 4. The connector 1 shown on the figures is a so-called VDA connector. It is recommended that the female plug-in part 4 and the male plug-in part 5 are manufactured out of at least one plastic, and the male plug-in part 5 and the female plug-in part 4 preferably consist of polyphenylene sulfide or essentially of polyphenylene sulfide. The retainer 6 preferably consists of steel or essentially of steel.

In the present embodiment, the female plug-in part 4 expediently has two retainer recesses 22 lying opposite each other, which are designed as retainer slits. This can be discerned in particular on FIG. 1. In the present embodiment, it is recommended that the male plug-in part 5 has a slanted surface 15, which rises in an axial direction of the male plug-in part 5, opposite the insertion direction of the male plug-in part 5. Axial direction of the male plug-in part 5 here means in particular the direction of the longitudinal axis LS of the male plug-in part 5. In the embodiments according to the figures, the slanted surface 15 rises by about 30° opposite the insertion direction of the male plug-in part 5. In the fixed or completely inserted state, the male plug-in part 5 is fixed to the female plug-in part 4 via the retainer 6. In the present embodiment, the retainer 6 preferably involves a U-shaped retainer. In the fixed or completely inserted state of the male plug-in part 5, the U-shaped retainer 6 preferably engages behind a stop flange 23 of the male plug-in part 5, and in the present embodiment preferably engages into a fixing groove 24 of the male plug-in part 5.

Figure 1:
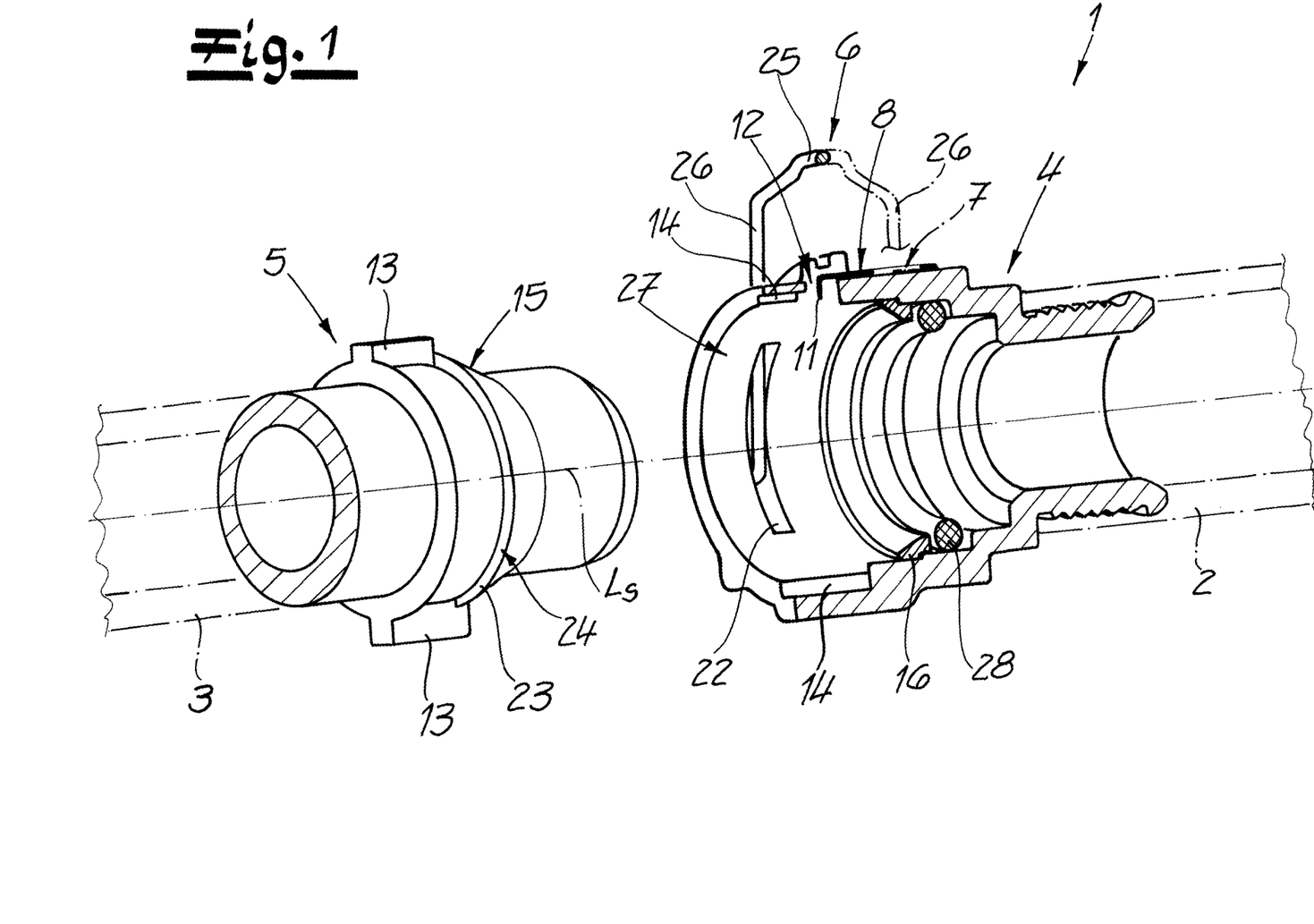
FIG. 1: is an overview of the connector according to the disclosure in a first embodiment.

In the present embodiment, it is recommended that the U-shaped retainer 6 is designed with a U-bracket 25 and two U-legs 26 hooked up to the U-bracket 25 (FIG. 1). In the present embodiment, the U-legs 26 each expediently engage through a retainer recess 22 of the female plug-in part 4 or each engage through this retainer recess 22 completely in the completely inserted or fixed state of the male plug-in part 5. The U-legs 26 here expediently engage behind the stop flange 23 of the male plug-in part 5, and in particular engage into the fixing groove 24 of the male plug-in part 5. In this state (FIGS. 2B, 3B, 4B and 5B), the male plug-in part 5 is completely and properly fixed to the female plug-in part 4.

Within the framework of the disclosure and in the present embodiment, the stop flange 23 is arranged before the slanted surface 15 of the male plug-in part 5 in the insertion direction of the male plug-in part 5, and in particular the slanted surface rear side has the stop flange 23 or comprises the stop flange 23 (FIG. 1).

Within the framework of the disclosure and in the present embodiment, the male plug-in part 5 has two centering elements 13, which in the fixed or completely inserted state of the male plug-in part 5 each engage into a form-fit recess 14 of the female plug-in part 4. In the embodiments according to the figures, the centering elements 13 protrude from the outer surface of the male plug-in part 5, and each engage into a form-fit recess 14 on the inner surface of a plug-in recess 27 of the female plug-in part 4. In the present embodiment, the centering elements 13 are here expediently arranged opposite each other on the outer surface of the male plug-in part 5, and preferably engage into two complementary form-fit recesses 14 on the inner surface of the plug-in recess 27 of the female plug-in part 4.

Within the framework of the disclosure and in the design example, the connector 1 has a sealing ring 28 as the sealing element, which in the fixed state of the male plug-in part 5 is held in the connector 1 by a spacer ring 16. In the present embodiment, the spacer ring 16 is preferably latched with the female plug-in part 4 in the fixed state of the male plug-in part 5.

Figure 2A:
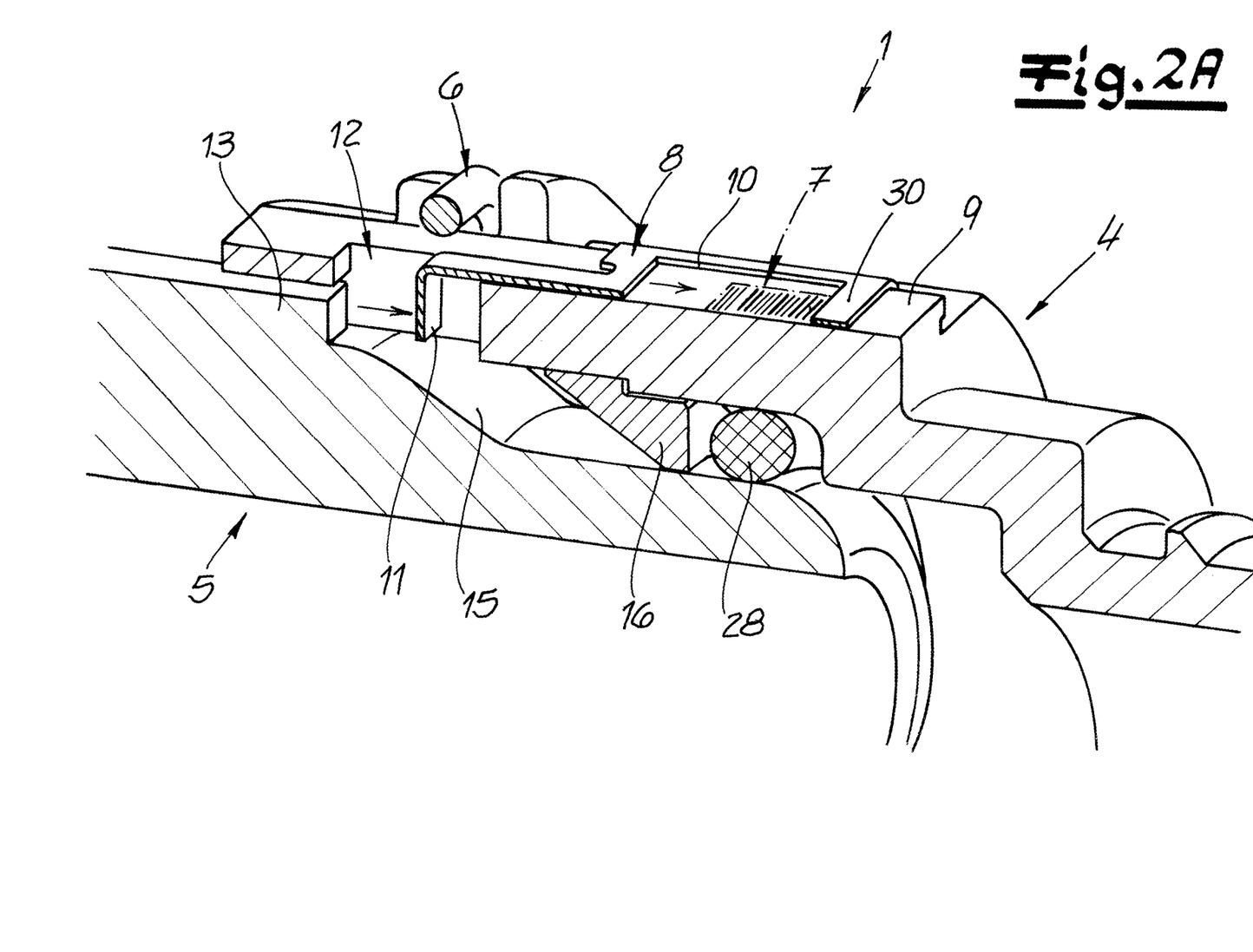
FIG. 2A: is a perspective view of a longitudinal section through the connector according to the disclosure in a first embodiment in the unfixed state of the male plug-in part.
Figure 2B:
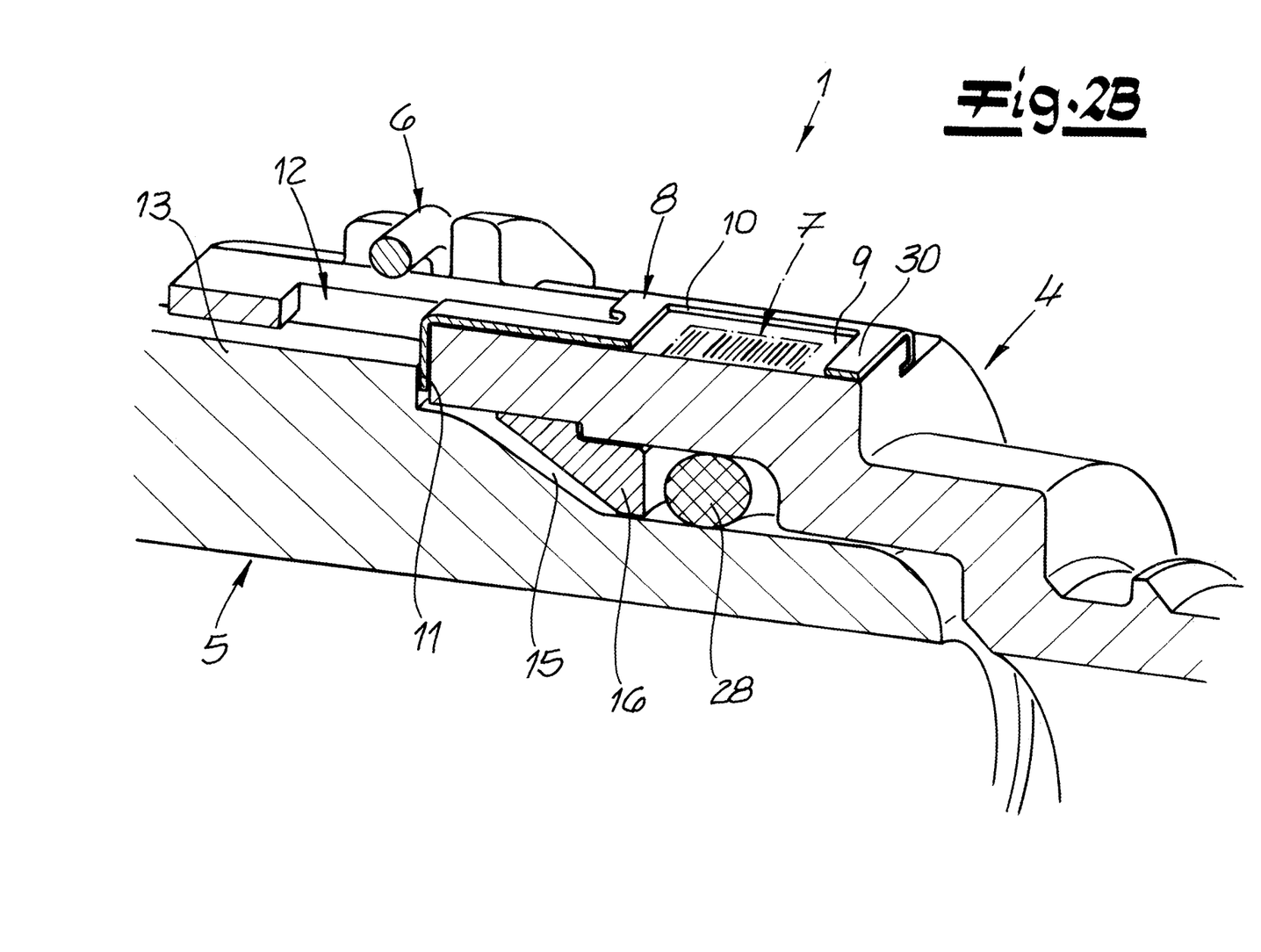
FIG. 2B: is the subject matter according to FIG. 2A in the fixed state of the male plug-in part.

According to the disclosure, the female plug-in part 4 has at least one verification element. In the embodiment according to FIGS. 1 to 4B, the verification element is designed in the form of a code 7, which in the unfixed state of the male plug-in part 5 is covered in areas by an aperture 8 arranged on the female plug-in part 4 and unreadable. This is depicted on FIGS. 2A, 3A and 4A. According to the disclosure, the aperture 8 is shifted in such a way during insertion of the male plug-in part 5 into the female plug-in part 4 that the verification element or the code 7 is complete and/or readable in the fixed or completely inserted state of the male plug-in part 5. In the embodiment according to FIGS. 2B, 3B and 4B, the code 7 is no longer covered by the aperture in the completely inserted state of the male plug-in part 5, but rather released and readable. Within the framework of the disclosure, readable means in particular that the verification element or the code 7 can be completely and correctly read out.

Figure 5A:
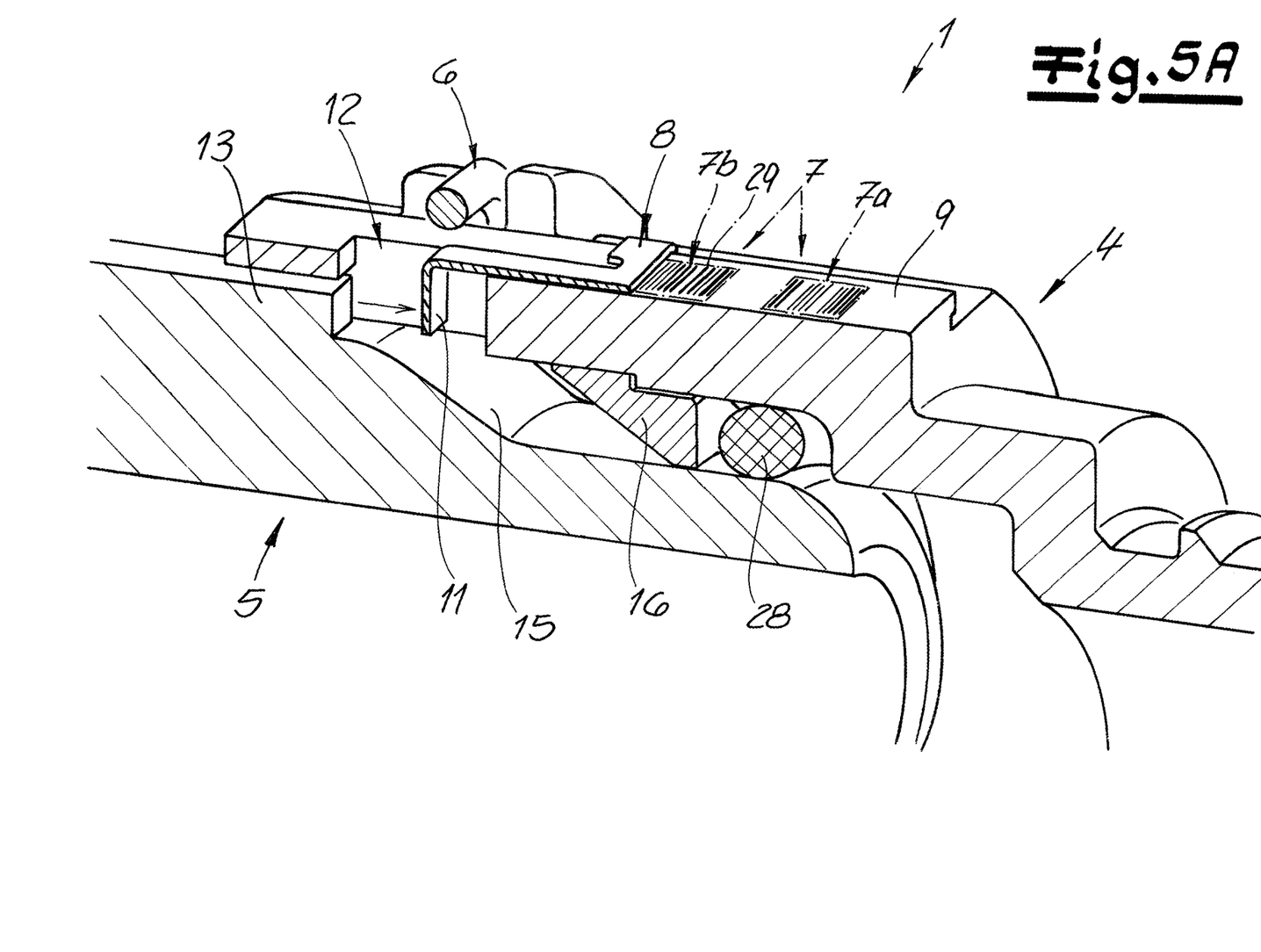
FIG. 5A: is a perspective view of a longitudinal section through the connector according to the disclosure in a fourth embodiment in an unfixed state of the male plug-in part.

According to the disclosure, the female plug-in part additionally or alternatively has at least a part of a verification element, in particular and in the embodiment according to FIGS. 5A, B in the form of a part 7a of a code 7, which in the unfixed state of the male plug-in part 5 is incomplete and unreadable. This is depicted on FIG. 5A. According to the disclosure, an additional or the missing part 7b of the verification element or the code 7 is arranged on an aperture 8 arranged on the female plug-in part 4. Within the framework of the disclosure and in the embodiment according to FIGS. 5A, B, the missing part 7b of the verification element or the code 7 is provided on a transparent film 29 on the aperture 8. During insertion of the male plug-in part 5 into the female plug-in part 4, the aperture 8 is shifted according to the disclosure in such a way that the verification element or the code 7 is complete and/or readable in the fixed or completely inserted state of the male plug-in part 5. In the embodiment according to FIGS. 5A, B, the different parts (7a, 7b) of the verification element or the code 7 are to this end merged by shifting the aperture 8, so that the code 7 is complete and readable. This can be discerned on FIG. 5B.

Within the framework of the disclosure and in the embodiments according to the figures, the verification element is designed in the form of a code 7. The code preferably involves a readable code, and very especially preferably a machine-readable code 7. In the present embodiment, the code 7 can be a barcode. If a correct connection was established between the male plug-in part 5 and the female plug-in part 4, the code 7 or the barcode can be read, for example by a readout device like a scanner or a mobile phone. The proper connection is verified in this way. It lies within the framework of the disclosure that the code 7 contains readable information relating to the connector 1, which after the two plug-in parts 4, 5 have been properly connected are readable or also readable during the reading process.

Figure 5B:
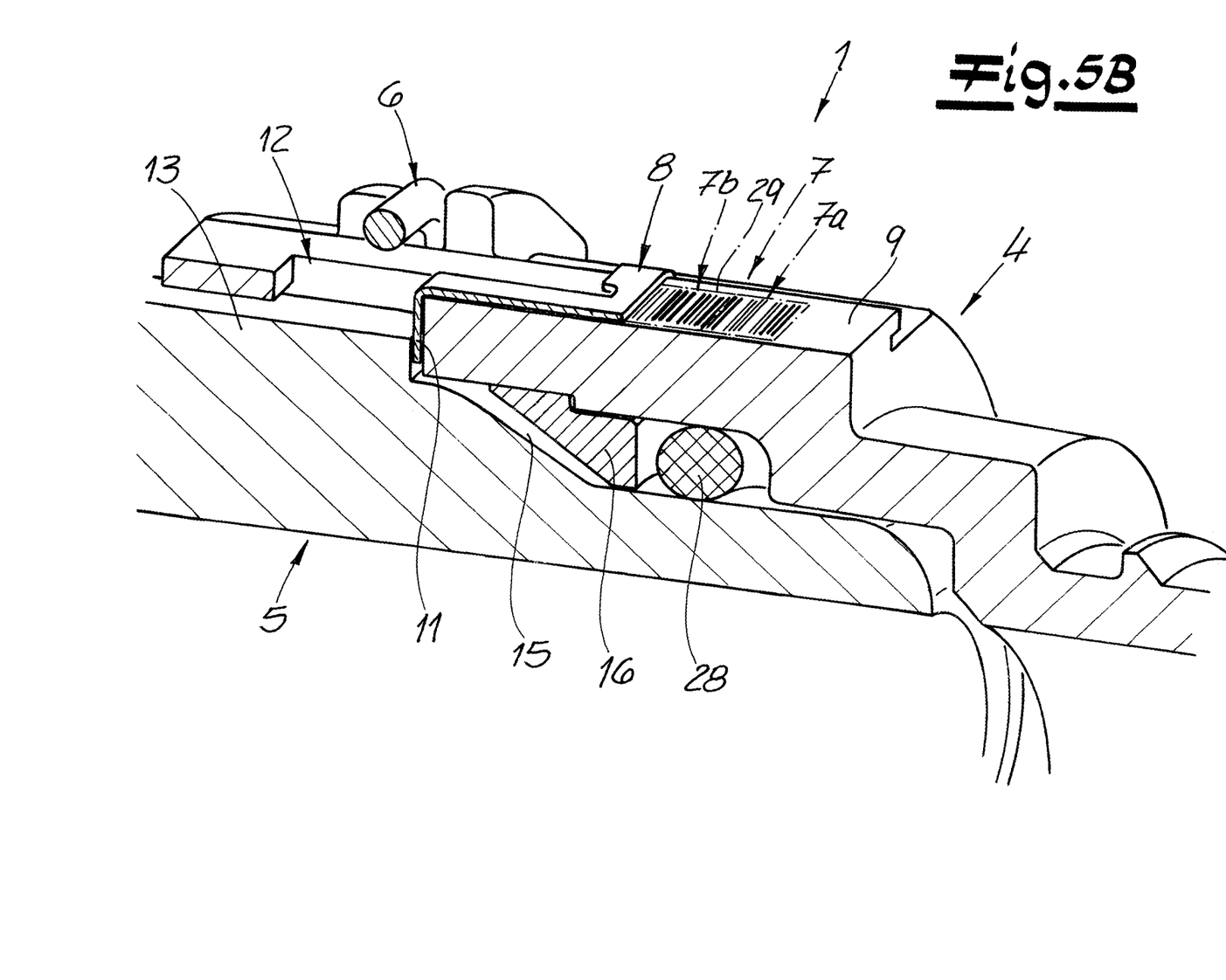
FIG. 5B: is the subject matter according to FIG. 5A in the fixed state of the male plug-in part.

In the present embodiment, it is recommended that the code 7 is arranged on or against the outer surface 9 of the female plug-in part 4. In the embodiment according to FIGS. 5A, B, a part 7a of a code 7 is arranged on the outer surface 9 of the female plug-in part 4. In the design example according to the figures, the code 7 is expediently immovably or essentially immovably arranged against or on the outer surface 9 of the female plug-in part 4. In the embodiment according to FIGS. 5A, B, this applies to the part 7a of the code 7 that is arranged on the outer surface 9 of the female plug-in part 4. The code 7 or the part 7a of the code 7 that is arranged against or on the outer surface 9 of the female plug-in part 4 within the framework of the disclosure and in the present embodiment is thus not movable relative to the female plug-in part 4.

In the present embodiment, the aperture 8 is expediently shifted axially in the insertion direction during insertion of the male plug-in part 5 into the female plug-in part 4, with the present embodiment recommending that it is guided or shifted axially in the insertion direction along the outer surface 9 of the female plug-in part 4. In the embodiment according to FIGS. 1 to 4B, the aperture 8 is preferably designed as a pinhole, and the code 7 is expediently readable through a recess 10 of the aperture 8 or pinhole in the fixed or completely inserted state of the male plug-in part 5, which is depicted on FIGS. 2B, 3B and 4B. In the embodiment according to the figures, the aperture 8 is preferably designed as a plate-like element. In the present embodiment, it is recommended that the aperture 8 consists of at least one metal or essentially of at least one metal, and is provided in particular as a metal sheet. If the aperture 8 is designed as a pinhole according to a preferred embodiment and on FIGS. 1 to 4B, at least areas of the code 7 are expediently covered by an edge area 30 that surrounds the recess 10 of the pinhole in the unfixed state of the male plug-in part 4. In the present embodiment, the edge area 30 of the aperture 8 or pinhole that covers the code 7 is expediently arranged behind the recess 10 in the insertion direction of the male plug-in part 5. This can be discerned on FIGS. 2A to 4B.

Figure 3A:
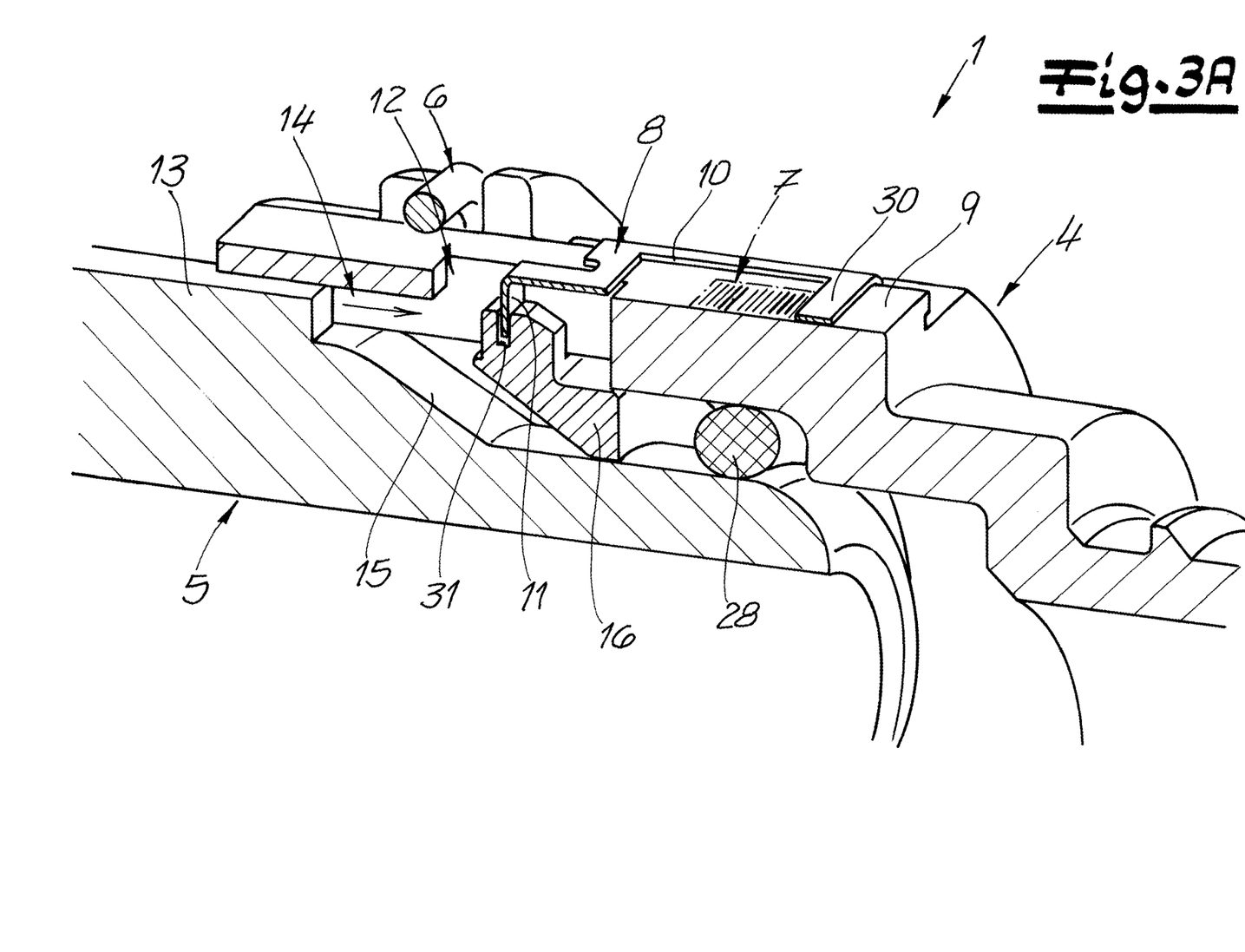
FIG. 3A: is a perspective view of a longitudinal section through the connector according to the disclosure in a second embodiment in an unfixed state of the male plug-in part.

Within the framework of the disclosure and in the present embodiment, the aperture 8 can be shifted through direct interaction with the male plug-in part 5 (FIGS. 1; 2A, B; 4A, B and 5A, B) or through indirect interaction with the male plug-in part 5 (FIGS. 3A, B). In this conjunction, direct interaction means in particular that the male plug-in part 5 interacts directly with the aperture 8 or acts on this aperture during insertion into the female plug-in part 4. In this conjunction, indirect interaction means in particular that the male plug-in part 5 no longer interacts directly with the aperture 8 or acts on the latter during insertion into the female plug-in part 4, but rather interacts with the aperture 8 by means of another element of the connector 1.

In the present embodiment, it is recommended that the aperture 8 has a contact extension 11 for interaction with the male plug-in part 5, which preferably engages through a contact recess 12 of the female plug-in part 4 and preferably engages into the interior space of the female plug-in part 4.

In the embodiments according to FIGS. 1; 2A, B; 4A, B and 5A, B, the contact extension 11 of the aperture 8 expediently protrudes into a form-fit recess 14 of the female plug-in part 4. In the embodiment according to FIGS. 1; 2A, B; 4A, B and 5A, B, a centering element 13 of the male plug-in part 5 preferably interacts directly with the contact extension 11 during insertion of the male plug-in part 5 into the female plug-in part 4, so that the aperture 8 is shifted.

Figure 3B:
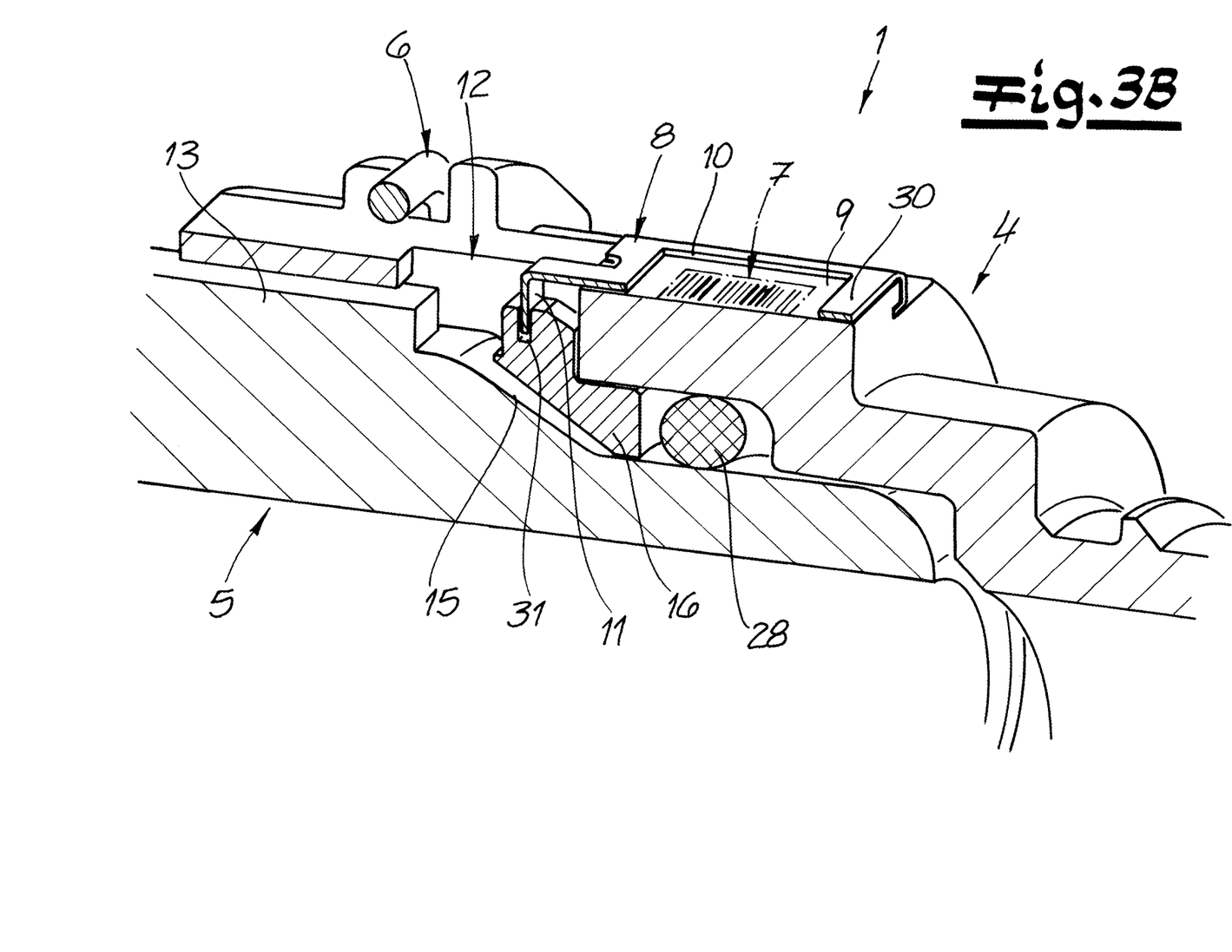
FIG. 3B: is the subject matter according to FIG. 3A in the fixed state of the male plug-in part.

In the embodiment according to FIGS. 3A, B, the aperture 8 is fastened to the spacer ring 16 by means of the contact extension 11. To this end, the contact extension 11 protrudes through the contact recess 12 of the female plug-in part 4 and into the plug-in recess 27 of the female plug-in part 4, and engages into a fastening recess 31 of the spacer ring 16 or is fixed in the latter. Within the framework of this embodiment, the spacer ring 16 is expediently not yet arranged in its end position in the female plug-in part 4 in the unfixed state of the male plug-in part 5 (FIG. 3A). In the embodiment according to FIGS. 3A, B, the spacer ring 16 is expediently shifted into its end position together with the aperture 8 during insertion of the male plug-in part 5 into the female plug-in part 4, and is there preferably latched with the female plug-in part 4 (FIG. 3B). Within the framework of the disclosure and in the embodiment according to FIGS. 3A, B, the male plug-in part 5 directly contacts the spacer ring 16 by means of its slanted surface 15, and in this way interacts indirectly with the contact extension 11 of the aperture 8, so that the aperture 8 is shifted during insertion of the male plug-in part 5.

Figure 4A:
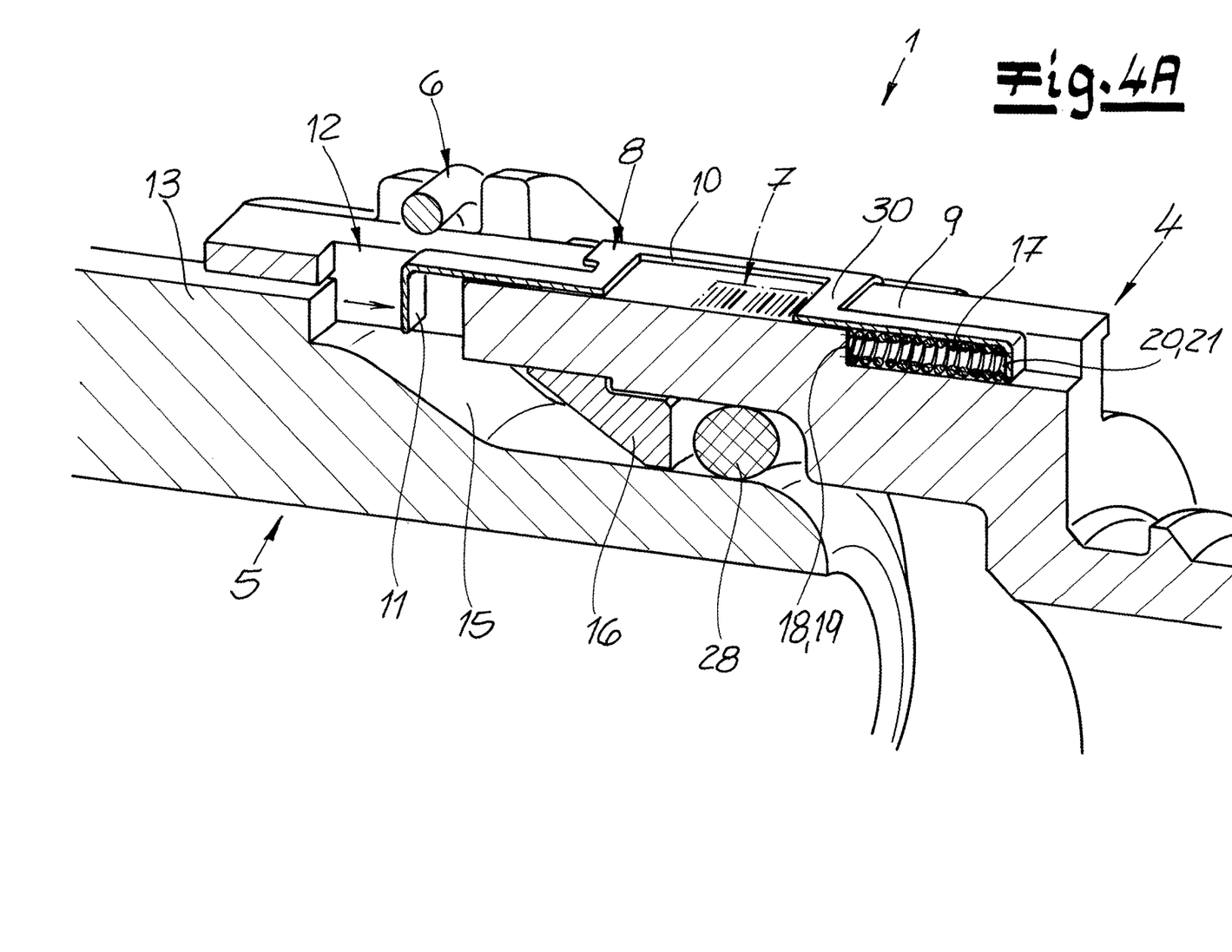
FIG. 4A: is a perspective view of a longitudinal section through the connector according to the disclosure in a third embodiment in an unfixed state of the male plug-in part.
Figure 4B:
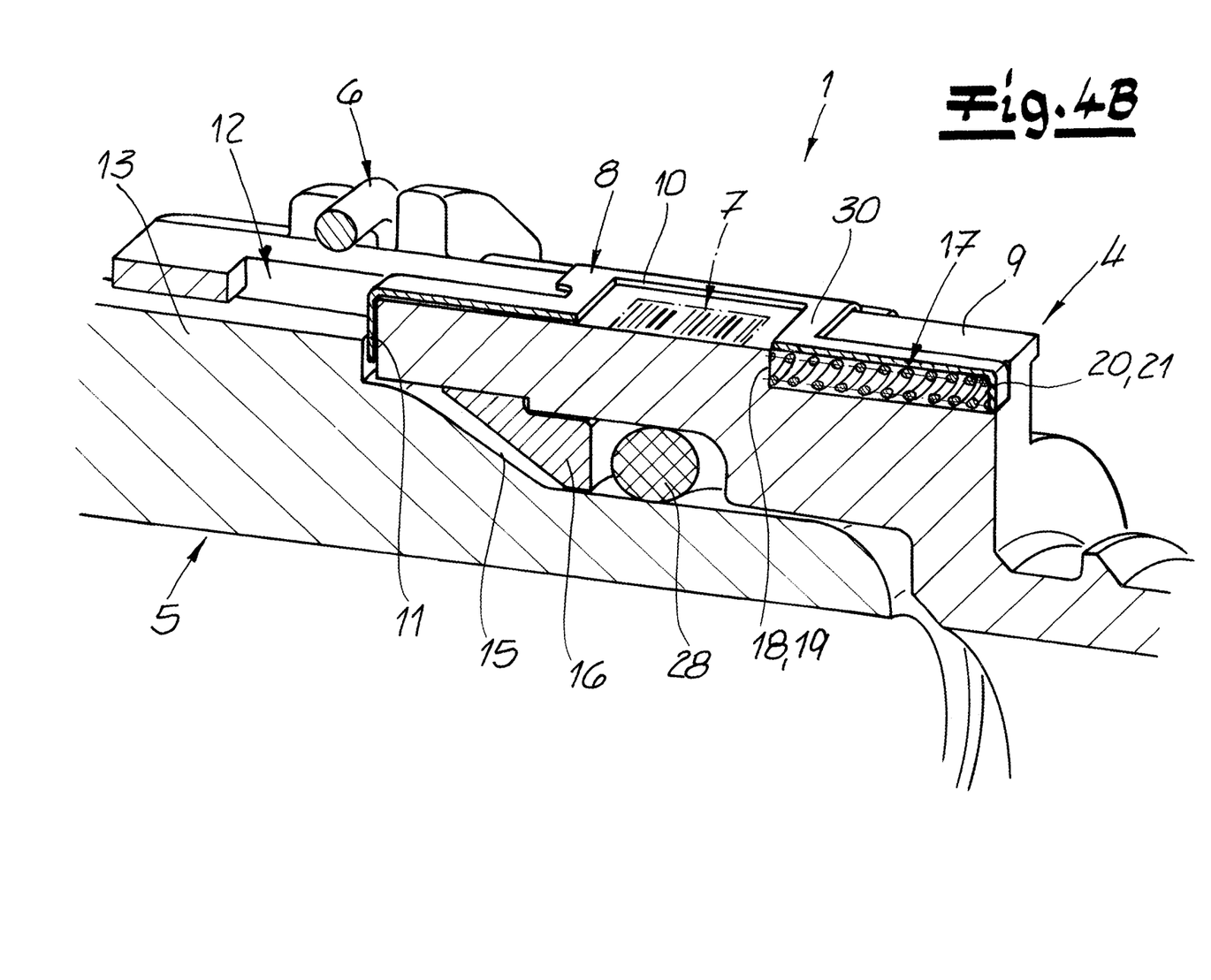
FIG. 4B: is the subject matter according to FIG. 4A in the fixed state of the male plug-in part.

FIGS. 4A, B show another preferred embodiment of the disclosure, in which the connector 1 has a spring 17 as the restoring element, which in the present embodiment is expediently arranged between the female plug-in part 4 and the aperture 8. In the present embodiment, it is recommended that the spring 17 is tensioned during insertion of the male plug-in part 5 into the female plug-in part 4. In the embodiment according to FIGS. 4A, B, the spring 17 is a helical spring, which expands during insertion of the male plug-in part 5 into the female plug-in part 4, and is thereby tensioned. When the male plug-in part 5 is detached from the female plug-in part 4, it is recommended that the aperture 8 is pushed back into its initial position by the restoring force. As a result, the verification process and in particular the clear indication of the proper fixing of the male plug-in part 5 to the female plug-in part 4 is reversible, and the verification process can be performed once more when again connecting the plug-in parts 4, 5. After the male plug-in part 5 has been detached from the female plug-in part 4, at least areas of the code 7 are then again covered by the aperture 8. Within the framework of the disclosure and in the embodiment according to FIGS. 4A, B, the contact extension 11 together with the aperture 8 can get back into the initial position of the aperture 8 while detaching the male plug-in part 5 from the female plug-in part 4 in the contact recess 12 and in the form-fit recess 14 of the female plug-in part 4.

In the embodiment according to FIGS. 4A, B, it is recommended that the spring 17 abuts against a stop surface 19 of the female plug-in part 4 with a first spring end 18, and expediently abuts against a stop surface 21 of the aperture 8 with a second spring end 20. Within the framework of the disclosure and in the embodiment according to FIGS. 4A, B, the spring 17 is arranged behind the code 7 in the insertion direction of the male plug-in part 5. Within the framework of the disclosure and in the present embodiment, the spring 17 further extends in an axial direction of the male plug-in part 5 and female plug-in part 4.

It is preferred that the verification element or the code 7 is applied to the female plug-in part 4 in at least one procedure selected from the following group: "Printing, laser marking, labeling, engraving". In the present embodiments according to the figures, the code 7 (FIGS. 1 to 4B) or the part 7a of a code 7 (FIGS. 5A, B) can have been applied to the female plug-in part 4 or to the outer surface 9 of the female plug-in part 4 by printing.

The invention claimed is:

1. A connector for connecting two fluid-conducting elements, one fluid-conducting element having a male plug-in part, the connector comprising:
    a female plug-in part configured to receive the male plug-in part inserted in an insertion direction;
    a retainer hooked up to the female plug-in part, and structured to fix the male plug-in part to the female plug-in part;
    wherein the female plug-in part has at least one verification element in the form of a code, which in an unfixed state of the male plug-in part is covered at least in areas by at least one aperture arranged on the female plug-in part and is unreadable and/or the female plug-in part has at least one part of a verification element in the form of a part of a code, wherein the verification element or the code is incomplete and unreadable in the unfixed state of the male plug-in part; and
    wherein at least one additional or the missing part of the verification element or the code is arranged on the at least one aperture on the female plug-in part, wherein the at least one aperture is shifted in such a way during insertion of the male plug-in part into the female plug-in part that the verification element or the code is complete and/or readable in a fixed or completely inserted state of the male plug-in part.

2. The connector according to claim 1, wherein the verification element or the code is a machine-readable code.

3. The connector according to claim 1, wherein the verification element or the code is arranged on the outer surface of the female plug-in part.

4. The connector according to claim 1, wherein the verification element or the code is immovably or essentially immovably arranged on the outer surface of the female plug-in part.

5. The connector according to claim 1, wherein the aperture is shifted axially in the insertion direction during insertion of the male plug-in part into the female plug-in part, and is guided axially in the insertion direction along the outer surface of the female plug-in part.

6. The connector according to claim 1, wherein the aperture is designed as a pinhole, and wherein the verification element or the code is readable through at least one recess of the pinhole in the fixed or completely inserted state of the male plug-in part.

7. The connector according to claim 1, wherein the aperture can be shifted through direct and/or indirect interaction with the male plug-in part.

8. The connector according to claim 1, wherein the aperture has at least one contact extension for interaction with the male plug-in part, wherein the contact extension engages through a contact recess of the female plug-in part, and projects into the interior space of the female plug-in part.

9. The connector according to claim 8, wherein the male plug-in part has at least one centering element, which in the fixed or completely inserted state of the male plug-in part engages into a form-fit recess of the female plug-in part, wherein the contact extension of the aperture protrudes into the form-fit recess of the female plug-in part, and wherein the centering element of the male plug-in part interacts with the contact extension during insertion of the male plug-in part into the female plug-in part, so that the aperture is shifted.

10. The connector according to claim 8, wherein the male plug-in part has a slanted surface, which directly interacts with the contact extension of the aperture during insertion of the male plug-in part into the female plug-in part, so that the aperture is shifted.

11. The connector according to claim 8, wherein at least one spacer ring is provided in the female plug-in part, which in the fixed or completely inserted state of the male plug-in part is arranged between the male plug-in part and the female plug-in part, and wherein the aperture is fastened to the spacer ring by way of the contact extension, wherein the spacer ring is not yet arranged in an end position in the female plug-in part in the unfixed state of the male plug-in part, and wherein the spacer ring is shifted together with the aperture into the end position during insertion of the male plug-in part into the female plug-in part.

12. The connector according to claim 1, wherein the connector has at least one restoring element which is arranged between the female plug-in part and the aperture, and which is tensioned during insertion of the male plug-in part into the female plug-in part, so that the aperture is pushed back into an initial position by the restoring force when the male plug-in part is separated from the female plug-in part.

13. The connector according to claim 12, wherein the restoring element is a that spring abuts against a stop surface of the female plug-in part with a first spring end, and abuts against a stop surface of the aperture with a second spring end.

14. The connector according to claim 1, wherein the verification element or the code is applied to the female plug-in part in at least one procedure selected from the following group: Printing, laser marking, labeling, engraving.

15. The connector according to claim 1, wherein the verification element or the code contains readable information relating to the connector and/or the manufacturer and/or the article number and/or the type and/or the material and/or the manufacturing date and/or the batch number of the connector, and/or contains an error-proof code.

16. The connector according to claim 2, wherein the machine-readable code is a QR-code and/or a barcode and/or a DataMatrix code.

17. The connector according to claim 5, wherein the aperture is guided axially in the insertion direction along the outer surface of the female plug-in part.

18. The connector according to claim 9, wherein the form-fit recess of the female plug-in part is arranged on the inner surface of the female plug-in part.

19. The connector according to claim 9, wherein the centering element of the male plug-in part interacts directly with the contact extension during insertion of the male plug-in part into the female plug-in part, so that the aperture is shifted.

20. The connector according to claim 12, wherein the at least one restoring element is at least one spring.

\* \* \* \* \*